United States Patent
Mueller

(10) Patent No.: US 10,567,960 B2
(45) Date of Patent: Feb. 18, 2020

(54) METHOD AND APPARATUS FOR AUTHENTICATING A TERMINAL DEVICE IN A COMMUNICATION NETWORK

(71) Applicant: Robert Bosch GmbH, Stuttgart (DE)

(72) Inventor: Andreas Mueller, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 47 days.

(21) Appl. No.: 15/289,268

(22) Filed: Oct. 10, 2016

(65) Prior Publication Data

US 2017/0111791 A1   Apr. 20, 2017

(30) Foreign Application Priority Data

Oct. 16, 2015 (DE) .......................... 10 2015 220 155

(51) Int. Cl.
| | |
|---|---|
| *H04W 12/06* | (2009.01) |
| *H04M 1/67* | (2006.01) |
| *G06F 21/44* | (2013.01) |
| *H04W 8/24* | (2009.01) |
| *H04W 12/00* | (2009.01) |
| *H04W 88/02* | (2009.01) |

(52) U.S. Cl.
CPC ............ *H04W 12/06* (2013.01); *G06F 21/44* (2013.01); *H04M 1/67* (2013.01); *H04W 8/245* (2013.01); *H04M 2250/12* (2013.01); *H04W 12/00504* (2019.01); *H04W 88/02* (2013.01)

(58) Field of Classification Search
CPC ..... H04W 12/06; H04W 8/245; H04W 88/02; H04W 16/00; H04W 84/18; H04W 40/24; H04M 1/67; H04M 2250/12; H04L 29/082; H04L 29/08; H04L 67/12; H04L 67/10; G06F 15/173; G06F 3/0484; G06F 3/04847; G06F 3/04842; G08B 25/009
USPC ....... 370/328, 329, 254, 256, 255, 252, 338; 709/223, 224
See application file for complete search history.

(56) References Cited

U.S. PATENT DOCUMENTS

| | | | |
|---|---|---|---|
| 2009/0011832 A1* | 1/2009 | Rofougaran ...... | H04M 1/72544 463/41 |
| 2011/0133910 A1* | 6/2011 | Alarcon ................. | A61H 19/32 340/407.1 |
| 2012/0101595 A1* | 4/2012 | Jung ......................... | A61F 2/68 623/25 |
| 2012/0250581 A1* | 10/2012 | Bilcu .................. | G08B 25/009 370/254 |

(Continued)

FOREIGN PATENT DOCUMENTS

DE   10 2013 215 216 A1   2/2015

*Primary Examiner* — Un C Cho
*Assistant Examiner* — Rasha K Fayed
(74) *Attorney, Agent, or Firm* — Norton Rose Fulbright US LLP; Gerard Messina

(57) ABSTRACT

A method for authenticating a terminal device in a communication network, wherein a communication connection is established between the terminal device and a network access node of the communication network; upon a sensory stimulation of the terminal device, the terminal device performs a recording of sensor data; the terminal device transmits the sensor data via the communication connection to the network access node; and the terminal device is authenticated by the network access node as a function of a confirmation or rejection of a playback of the sensor data.

20 Claims, 2 Drawing Sheets

(56) References Cited

U.S. PATENT DOCUMENTS

| | | | | |
|---|---|---|---|---|
| 2013/0273504 A1* | 10/2013 | Carter | .................... | F41A 33/00 |
| | | | | 434/19 |
| 2015/0212722 A1* | 7/2015 | Leung | ................ | G06F 3/04847 |
| | | | | 726/19 |
| 2016/0057135 A1* | 2/2016 | Jiang | .................. | H04L 63/0853 |
| | | | | 713/172 |
| 2016/0234184 A1* | 8/2016 | Liu | ........................ | G06F 16/24 |
| 2017/0207926 A1* | 7/2017 | Gil | ........................ | G06Q 10/20 |
| 2018/0020350 A1* | 1/2018 | Vissa | .................... | G06F 1/163 |

\* cited by examiner

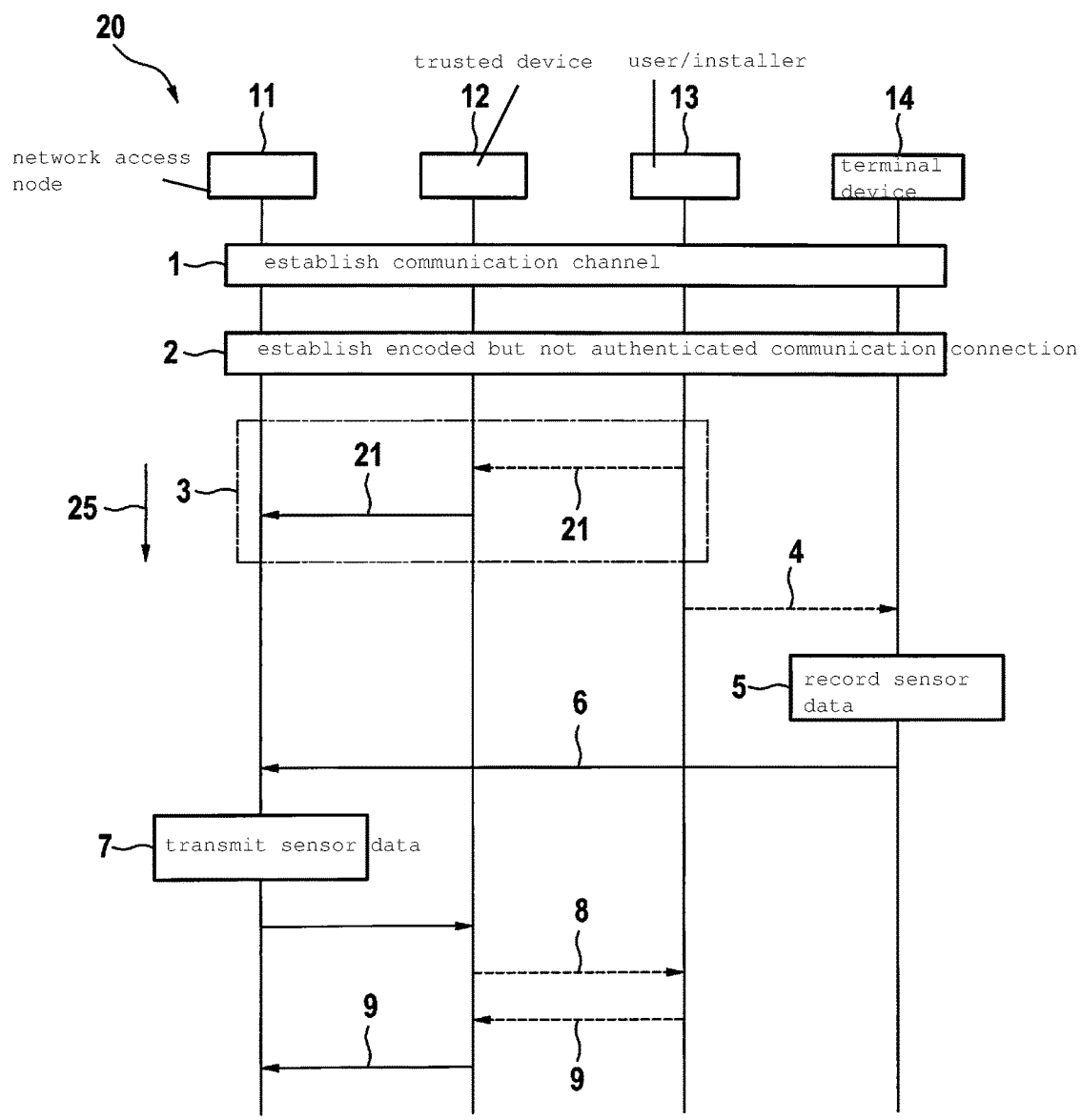

METHOD AND APPARATUS FOR AUTHENTICATING A TERMINAL DEVICE IN A COMMUNICATION NETWORK

CROSS REFERENCE

The present application claims the benefit under 35 U.S.C. § 119 of German Patent Application No. DE 102015220155.4 filed on Oct. 16, 2015, which is expressly incorporated herein by reference in its entirety.

FIELD

The present invention relates to a method for authenticating a terminal device in a communication network. The present invention furthermore relates to a corresponding apparatus, to a corresponding computer program, and to a corresponding memory medium.

BACKGROUND INFORMATION

In information-technology architecture, the integrated system of informatic software-technology components with mechanical and electronic parts, linked via a data infrastructure such as the Internet, is referred to as a "cyber-physical system." Cyber-physical systems of the species are embodied by linking embedded systems to produce wire-based or wireless communication networks. Known cyber-physical systems are therefore characterized in some cases by a high degree of complexity.

German Patent Application No. DE 20 2013 215216 A1 describes a method for associating a first apparatus with a second apparatus, encompassing: "calling on" the first apparatus by way of the second apparatus, the call encompassing at least one contact between the first apparatus and the second apparatus; measuring first measured data, related to the call, of the first apparatus; measuring second measured data, related to the call, of the second apparatus; delivering at least a first part of the measured first measured data of the first apparatus to an evaluation device; delivering at least a second part of the measured second measured data of the second apparatus to the evaluation device; comparing the delivered first part of the first measured data of the first apparatus with the delivered second part of the second measured data of the second apparatus in the evaluation device; and associating the first apparatus with the second apparatus by way of the evaluation device if at least a third part of the first measured data of the first apparatus and at least a fourth part of the second measured data of the second apparatus correlate at least with one another in time according to the result of the comparison.

SUMMARY

The present invention includes a method for authenticating a terminal device in a communication network; a corresponding apparatus; a corresponding computer program; and a corresponding memory medium.

An advantage of the example method is its simplicity; in particular, there is no need to configure passwords or otherwise to agree in advance regarding secrets.

The terminal device to be authenticated requires de facto no special operating elements such as displays, keyboard, or operating knobs for establishment according to the present invention of a secure connection, and there is also no need to execute any calculation-intensive algorithms.

There is furthermore no need to present certificates for the terminal device, and a complex and costly public key infrastructure (which in principle would be an alternative possibility for authentication) is also not necessary. The approach therefore functions even if no Internet connection is available.

The security and reliability of the authentication can be flexibly adapted depending on the requirements of the respective applications.

In some circumstances the approach offers greater security than alternative methods that are based on a previously agreed-upon secret, for example authentication based on challenge and response on the basis of a previously agreed-upon key ("pre-shared key," PSK) or password, since the security of such alternative approaches becomes ineffective if the previously agreed-upon secret happens to fall into the hands of an attacker, for example due to invasive attacks, side-channel attacks, or long-term communication eavesdropping. Because an embodiment of the present invention makes do without such previously agreed-upon secrets, these weak points therefore do not exist.

Advantageous refinements of and improvements to the example method are possible thanks to the features and refinements described herein. The approach described can easily be combined with aspects of "gamification," or already per se represents such an approach. For residential users in particular, playful integration of intelligent devices into their home network definitely represents a possible fun factor, since this can be more entertaining than, for example, configuring complex passwords.

BRIEF DESCRIPTION OF THE DRAWINGS

Exemplifying embodiments of the present invention are depicted in the figures and explained in further detail below.

FIG. 2 shows an example of execution of a method according to an embodiment.

DETAILED DESCRIPTION OF EXAMPLE EMBODIMENTS

Figure 1:
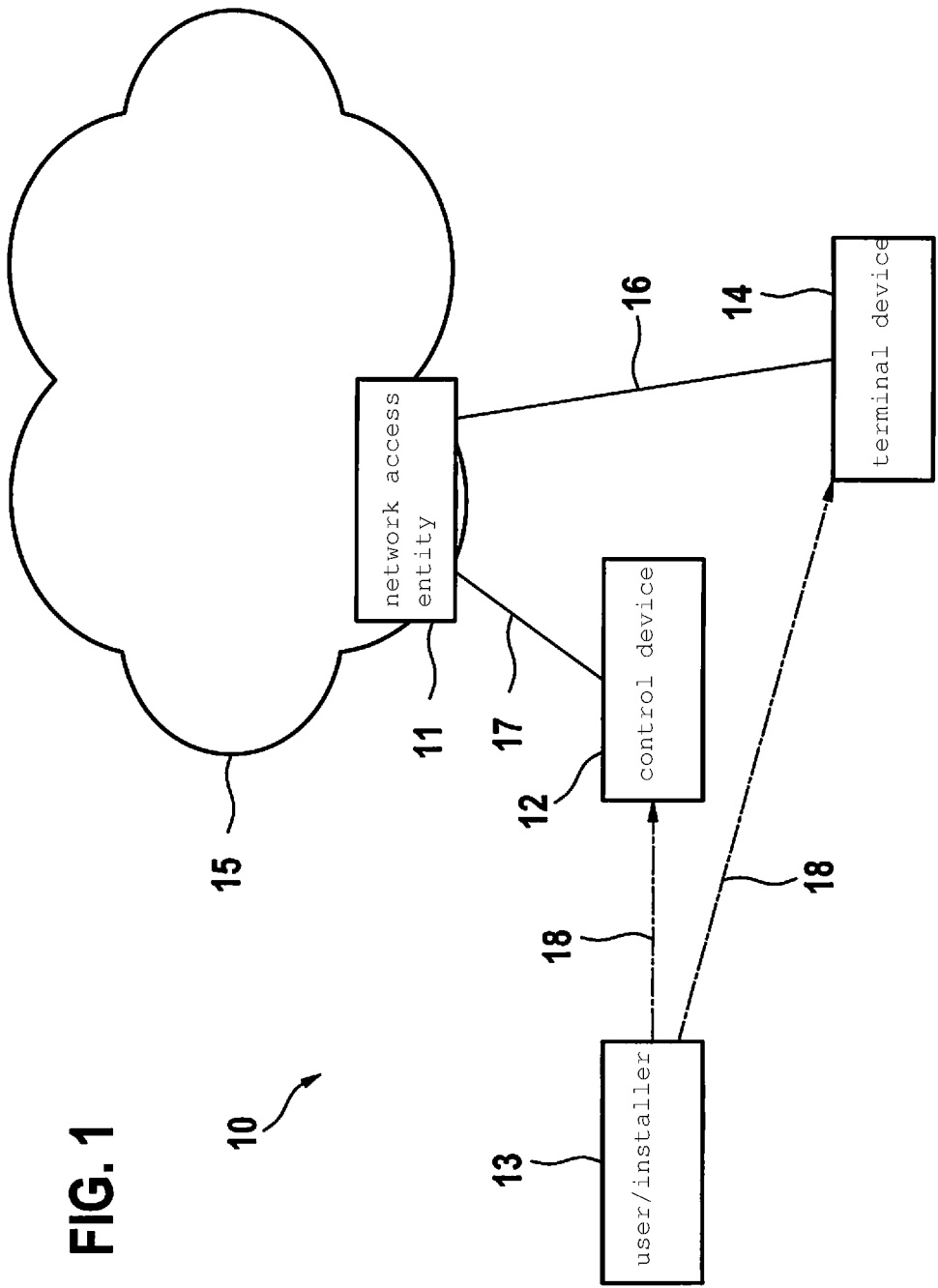
FIG. 1 is a block diagram of an assemblage in question.

What is considered below is always an assemblage as shown in FIG. 1, having the following logical instances:

Communication network 15 is any wireless, wire-based, optical, or hybrid/heterogeneous network that can be made up of a plurality of nodes. In an advantageous manifestation it is, in particular, a local area network (LAN) that can nevertheless also be connected via suitable routers or gateway nodes to a wide area network (WAN), for example to the Internet.

Network access node (network access entity) 11 is a special node of communication network 15 with the aid of which further devices can be integrated into communication network 15. Communication network 15 can contain one or more network access nodes 11. In an advantageous manifestation, network access node 11 is a radio access node (access point, base station) or a node of a wireless meshed network, e.g. based on ZigBee, with the aid of which further nodes can be integrated into communication network 15 via radio transfer.

Terminal device (sensor-enabled device) 14 that is to be authenticated is any device that is equipped with one or more sensors. Sensors for a plurality of physical magnitudes can be considered, for example acceleration sensors, rotation rate sensors, microphones and other acoustic sensors, photosensors (for example cameras or brightness sensors), or pressure sensors. It is self-evident that combinations of various sensors are also possible.

Terminal device 14 is capable of establishing with network access node 11 a communication connection 15 that, however, at first is unsecured and in particular is not authenticated. The purpose of the present embodiment is specifically to authenticate terminal device 14 in simple fashion with regard to communication network 15 or network access node 11.

In an advantageous manifestation of the present invention, terminal device 14 is a wireless sensor node that, in addition to one or various sensors, is also equipped with a microcontroller and with a dedicated communication module that, for example, supports one of the following transfer standards: WiFi per IEEE 802.11, Bluetooth, ZigBee, ANT, ANT+, or DECT. Terminal device 14 furthermore possesses, not obligatorily, a convenient user interface (e.g., display, keyboard, or operating elements) so that a simple and direct interaction between user or installer 13 on the one hand, and terminal device 14 on the other hand, often is not possible.

Control device (trusted device) 12 is a device that already possesses a secure and, in particular, authenticated connection 17 with communication network 15. This secure connection can be created with a plurality of already established methods, for example by using a previously agreed-upon key or certificate-based authentication methods based on a public key infrastructure.

Control device 12, in particular, makes available a suitable user interface, e.g. display or loudspeaker. In an advantageous manifestation of the present invention, operating device 12 is a mobile device such as a tablet PC or a smartphone.

Because instances 11, 12, 14 described here are all to be regarded initially as logical instances, control device 12 can also be integrated directly into network access node 11. For example, network access node 11 could be a smart home gateway that not only makes available a wireless access point but at the same time also implements the functionality of control device 12 via a display or other user interfaces.

User or installer 13 is the actual user who wishes to integrate terminal device 14 securely into communication network 15. He or she has, for that purpose, direct access 18 to control device 12 and to terminal device 14.

The embodiment shown in FIG. 2 refers to a method 20 with which user or installer 13 can securely integrate terminal device 14, with the aid of control device 12, via network access node 11 into communication network 15. Of particular concern here is the manner in which terminal device 14 can authenticate itself with regard to communication network 15 so that only legitimate devices can be integrated into communication network 15.

The proposed method 20 is configured as follows:

Terminal device 14 establishes a communication channel with network access node 11, in the sense that terminal device 14 can exchange data with network access node 11 (reference character 1). The manner in which such a connection is to be established or can be established normally depends on the specific transfer system in question, and is correspondingly standardized or specified.

Terminal device 14 and network access node 11 then establish an encoded but not yet authenticated communication connection 16, for which a number of possibilities exist. In a first embodiment, terminal device 14 and network access node 11 generate symmetrical cryptographic keys from the properties of the communication channel located between them. In a second embodiment, terminal device 14 and network access node 11 generate symmetrical cryptographic keys using a suitable key exchange method such as Diffie-Hellman key exchange or elliptic curve Diffie-Hellman (ECDH). In a third embodiment, terminal device 14 and network access node 11 use asymmetrical encoding methods such as RSA.

Terminal device 14 and network access node 11 can then therefore exchange data via the encoded communication connection 16 with assured confidentiality in terms of possible attackers, but there is not yet any assurance that terminal device 14 is an authorized device, since no authentication of terminal device 14 has yet occurred.

In an optional method step 3, user or installer 13 explicitly starts the authentication procedure, for example by actuating a corresponding control element (e.g. a button) on the trustworthy control device 12. Terminal device 14 thereupon transmits a corresponding message to network access node 11, whereupon the latter shifts into a mode in which it receives data from terminal device 14.

User or installer 13 stimulates the sensor apparatus of terminal device 14 in suitable fashion. The exact manner in which this stimulation 4 occurs is, however, initially up to user or installer 13, i.e. there is, in particular, no corresponding authentication challenge. For example, if terminal device 14 possesses inertial sensors, user or installer 13 can perform any desired motions or gestures therewith. If a microphone is present, he or she can produce acoustic sounds (e.g., hum a melody); and if photosensors are present, he or she can generate a specific pattern in this context by influencing the incident light quantity, for example by randomly covering or uncovering the sensor element. If terminal device 14 in fact has a camera, user or installer 13 can simply use it to create an image of a specific object or a specific scene.

Terminal device 14 measures the stimulation 4 of the sensor apparatus by user or installer 13 and optionally performs a suitable pre-processing of the raw data. This could be, for example, compensation for or reduction of noise or drift, compression, or other filtering or conditioning of the raw data.

Terminal device 14 transmits the pre-processed sensor data 6 to network access node 11. This can happen either via the encoded communication connection 16 or in unencoded fashion.

Network access node 11 accepts the received sensor data 6 and optionally performs further processing 7. This could once again encompass, for example, the aspects mentioned with regard to terminal device 14—either alternatively or additionally, for example using more-complex algorithms.

Network access node 11 transmits the sensor data processed in step 7 to control device 12 via the already existing secure connection.

Control device 12 suitably prepares the sensor data obtained by way of further processing step 7 and signals them to user or installer 13. The manner in which this signal is optimally given depends in turn on the type of sensor data available. For the case of inertial sensors, for example, control device 12 can depict on the display the trajectory or motion carried out by user or installer 13. In the case of a microphone, for example, it can play back the received acoustic signals via a loudspeaker, or alternatively or additionally can also display the underlying waveform on the display.

Especially in the case of photosensors as well, a visual, haptic, acoustic, or other playback 8 of the sensor data processed in step 7 can occur. In the general case this is done by stimulating one or more actuators on control device 12; here as well, a display is regarded as an actuator.

User or installer 13 perceives the signal or output via terminal device 14 and checks whether playback 8 corresponds to stimulation 4 that he or she performed. If so, user or installer 13 correspondingly confirms this, for example once again by actuating a suitable control element on control device 12. If not, or if user or installer 13 is not certain, then he or she rejects it. Control device 12 then in turn signals the confirmation or rejection 9 of playback 8 to network access node 11 with the aid of a suitable message. In the latter case the authentication would fail and the above steps can be repeated, whereas in the former case the authentication has been successfully completed.

The security and reliability of the above-described approach is therefore ultimately based on the fact that network access node 11 already trusts control device 12 and assumes that only the legitimate user or installer 13 has access 18 to control device 12. This could be further supported, for example, by the fact that control device 12 is access-protected and that interaction with a person is possible only when, for example, a password or access code is entered or a suitable dongle or smart card is inserted into control device 12.

This embodiment can be expanded and modified in many ways. A few examples of this will be briefly outlined below.

Alternatively to method step 3, the beginning of the authentication phase can also be implicitly recognized by terminal device 14 and signaled to network access node 11. This can be accomplished, for example, in such a way that terminal device 14 detects when a significant stimulation 4 of the sensor apparatus from outside occurs. Possibilities are, for example, a vigorous movement, significant fluctuations in detected brightness, significant acoustic signals, or detection of a spoken code word.

After the establishment 2 of communication connection 16, an indication can additionally be given to user or installer 13 as to how he or she is to interact with terminal device 14, or which type of sensor apparatus is in fact present. To recognize this, terminal device 14 could, for example, firstly inform network access node 11 regarding the sensor apparatus that is present and is to be used, and this would then be conveyed to control device 12. The latter would then prompt user or installer 13, for example, to perform random motions or to hum a melody.

The steps from stimulation 4 of terminal device 14 to playback 8 of the sensor data further processed in step 7 could also be cycled through continuously in a loop and not block-by-block. In this case the sensor data would be continuously conveyed by terminal device 14 to network access node 11 and then from there to control device 12. User or installer 13 would thus have quasi-instantaneous feedback regarding the sensor data being transmitted, and could thus assess appreciably better whether or not the values conform to his or her stimulation 4 of the sensor apparatus.

Supplementing the previous item, in the context of a continuous transmission of sensor data by terminal device 14, network access node 11 or control device 12 could continuously check whether the degree of stimulation 4 of the sensor apparatus already contains sufficient entropy to allow a sufficiently high degree of security to be ensured. This could then in turn be signaled immediately to user or installer 13 via control device 12, for example with the aid of a progress bar or a traffic light. User or installer 13 would then know how long, or how vigorously or randomly, he or she needs to interact further with terminal device 14 in order to achieve the desired degree of security. In particular in conjunction with this continuous determination of the entropy of the interaction carried out with the terminal device, the degree of security that is desired and is correspondingly signaled to the user can be adapted and ensured almost arbitrarily and at any time.

With regard to the embodiments so far discussed it has always been assumed that a secure communication connection 16 to network access node 11, i.e., to the direct access point of communication network 15, is to be established. The proposed method 20 can in principle also be usefully utilized, however, if terminal device 14 wishes to establish a secure connection to any node in the Internet.

What is claimed is:

1. A method for authenticating a terminal device in a communication network, comprising:
   establishing a communication connection between the terminal device and a network access node of the communication network;
   upon a sensory stimulation of the terminal device by a human user, recording, by the terminal device, sensor data, the sensor data being data generated by the terminal device as a result of the sensory simulation by the human user;
   transmitting, by the terminal device, the sensor data via the communication connection to the network access node;
   transmitting, by the network access node, the sensor data to a trustworthy control device using a secure connection between the network access node and the trustworthy control device, wherein the trustworthy control device is a separate device relative to the terminal device;
   playing back to the human user, by the trustworthy control device, the sensor data transmitted by the network access node; and
   authenticating, by the network access node, the terminal device as a function of a confirmation or a rejection of the playback of the sensor data by the trustworthy control device, the confirmation or the rejection being accomplished by the human user actuating a control element of the trustworthy control device,
   wherein to establish an encoded but unauthenticated communication connection one of the following is satisfied: (i) the terminal device and the network access node generate symmetrical cryptographic keys from properties of the communication channel located between them; (ii) the terminal device and the network access node generate symmetrical cryptographic keys using a key exchange method including a Diffie-Hellman key exchange or elliptic curve Diffie-Hellman; and (iii) the terminal device and the network access node use an asymmetrical encoding method including RSA.

2. The method as recited in claim 1, wherein after establishment of the communication connection, the terminal device and the network access node perform an encoding of the communication connection.

3. The method as recited in claim 1, wherein in a method step preceding the stimulation, the human user of the terminal device supplies a triggering pulse to the trustworthy control device, wherein the trustworthy control device conveys the triggering pulse to the network access node, and wherein the triggering pulse triggers the recording.

4. The method as recited in claim 3, wherein after establishment of the communication connection, the trustworthy control device prompts the human user to stimulate the terminal device.

5. The method as recited in claim 1, wherein the terminal device recognizes the stimulation, and wherein the terminal device automatically triggers the recording in response to the stimulation.

6. The method as recited in claim 1, wherein before the playback of the sensor data, processing of the sensor data at least by the network access node is accomplished.

7. The method as recited in claim 1, wherein an entropy or randomness of the stimulation is signaled by the network access node to the control device.

8. The method as recited in claim 1, wherein the terminal device includes inertial sensors, and the human user performs the sensory stimulation by moving the terminal device in a motion, and wherein the playback of the sensor data by the control device includes displaying a trajectory of the motion.

9. The method as recited in claim 1, wherein the terminal device includes a microphone, and the human user performs the sensory stimulation by producing an acoustic sound, and wherein the playback of the sensor data by the control device includes reproducing the acoustic sound using a loudspeaker.

10. The method as recited in claim 1, wherein the terminal device includes a photosensor, and human user performs the sensory stimulation by influencing light incident on the photosensor in a pattern, and wherein the playback of the sensor data by the control device includes reproducing the pattern haptically or acoustically.

11. The method as recited in claim 1, wherein the terminal device includes a photosensor, and human user performs the sensory stimulation by influencing light incident on the photosensor in a pattern, and wherein the playback of the sensor data by the control device includes reproducing the pattern visually.

12. The method as recited in claim 1, wherein a secure, authenticated communication between the terminal device and the network access node is established based on the authentication of the terminal device.

13. The method as recited in claim 1, wherein in the authenticating, the network access node authenticates the terminal device without any password being required.

14. The method as recited in claim 1, wherein the network access node is an access point or a base station, wherein the access point or the base station is a device with the aid of which further devices are integrated into the communication network.

15. A non-transitory machine-readable memory medium on which is stored a computer program, which is executable by a processor, comprising:
    a program code arrangement having program code for authenticating a terminal device in a communication network, by performing the following:
        establishing a communication connection between the terminal device and a network access node of the communication network;
        upon a sensory stimulation of the terminal device by a human user, causing a recording of sensor data by the terminal device, the sensor data being data generated by the terminal device as a result of the sensory simulation by the human user;
        causing the terminal device to transmit the sensor data via the communication connection to the network access node;
        causing the network access node to transmit the sensor data to a trustworthy control device using a secure connection between the network access node and the trustworthy control device, wherein the trustworthy control device is a separate device relative to the terminal device;
        causing the trustworthy control device to play back to the human user the sensor data transmitted by the network access node; and
        causing the network access node to authenticate the terminal device as a function of a confirmation or a rejection of the playback of the sensor data by the trustworthy control device, the confirmation or the rejection being accomplished by the human user actuating a control element of the trustworthy control device,
    wherein to establish an encoded but unauthenticated communication connection one of the following is satisfied: (i) the terminal device and the network access node generate symmetrical cryptographic keys from properties of the communication channel located between them; (ii) the terminal device and the network access node generate symmetrical cryptographic keys using a key exchange method including a Diffie-Hellman key exchange or elliptic curve Diffie-Hellman; and (iii) the terminal device and the network access node use an asymmetrical encoding method including RSA.

16. The non-transitory machine-readable memory medium as recited in claim 15, wherein in the authenticating, the network access node authenticates the terminal device without any password being required.

17. The non-transitory machine-readable memory medium as recited in claim 15, wherein the network access node is an access point or a base station, wherein the access point or the base station is a device with the aid of which further devices are integrated into the communication network.

18. A device, comprising:
    a non-transitory machine-readable memory medium on which is stored a computer program, which is executable by a processor, including:
        a program code arrangement having program code for authenticating a terminal device in a communication network, by performing the following:
            establishing a communication connection between a terminal device and a network access node of a communication network;
            causing, upon a sensory stimulation of the terminal device by a human user, a recording of sensor data by the terminal device, the sensor data being data generated by the terminal device as a result of the sensory simulation by the human user;
            causing the terminal device to transmit the sensor data via the communication connection to the network access node;
            causing the network access node to transmit the sensor data to a trustworthy control device using a secure connection between the network access node and the trustworthy control device, wherein the trustworthy control device is a separate device relative to the terminal device;
            causing the trustworthy control device to play back to the human user the sensor data transmitted by the network access node; and
            causing the network access node to authenticate the terminal device as a function of a confirmation or a rejection of the playback of the sensor data by the trustworthy control device, the confirmation or the rejection being accomplished by the human user actuating a control element of the trustworthy control device, wherein to establish an encoded but unauthenticated communication connection one of the following is satisfied: (i) the terminal device and the network access node generate symmetrical cryptographic keys from properties of the communication channel located between them; (ii) the terminal device and the network access node generate symmetrical cryptographic keys using a key exchange method including a Diffie-Hellman key exchange or elliptic curve Diffie-Hellman; and (iii) the terminal device and the network access node use an asymmetrical encoding method including RSA.

19. The device as recited in claim 18, wherein in the authenticating, the network access node authenticates the terminal device without any password being required.

20. The device as recited in claim 18, wherein the network access node is an access point or a base station, wherein the access point or the base station is a device with the aid of which further devices are integrated into the communication network.

\* \* \* \* \*